(12) United States Patent
Voigtlaender et al.

(10) Patent No.: US 9,550,489 B2
(45) Date of Patent: Jan. 24, 2017

(54) DEVICE AND METHOD FOR REGULATING AN ENERGY RECOVERY IN A PEDAL-DRIVEN VEHICLE

(75) Inventors: Klaus Voigtlaender, Wangen (DE); Lars von Jakubowski, Abstatt (DE)

(73) Assignee: ROBERT BOSCH GMBH, Stuttgart (DE)

( * ) Notice: Subject to any disclaimer, the term of this patent is extended or adjusted under 35 U.S.C. 154(b) by 650 days.

(21) Appl. No.: 13/497,206

(22) PCT Filed: Aug. 4, 2010

(86) PCT No.: PCT/EP2010/061349
§ 371 (c)(1),
(2), (4) Date: Jun. 5, 2012

(87) PCT Pub. No.: WO2011/035974
PCT Pub. Date: Mar. 31, 2011

(65) Prior Publication Data
US 2012/0239235 A1    Sep. 20, 2012

(30) Foreign Application Priority Data

Sep. 22, 2009 (DE) .......................... 10 2009 029 658

(51) Int. Cl.
*B60W 10/08* (2006.01)
*B60W 10/00* (2006.01)

(52) U.S. Cl.
CPC .............. *B60W 10/08* (2013.01); *B60W 10/00* (2013.01)

(58) Field of Classification Search
CPC ............................. B60W 10/08; B60W 10/00
See application file for complete search history.

(56) References Cited

U.S. PATENT DOCUMENTS

| 4,637,274 A * | 1/1987 | Goldenfeld ................... 74/625 |
| 2004/0231905 A1* | 11/2004 | Kurita et al. ................ 180/205 |
| 2010/0050785 A1* | 3/2010 | Roessingh et al. ...... 73/862.191 |

FOREIGN PATENT DOCUMENTS

| CN | 1530285 | 9/2004 |
| CN | 1836970 | 9/2006 |
| CN | 101336187 | 12/2008 |
| DE | 196 00 698 | 8/1997 |
| DE | 198 55 585 | 6/2000 |
| EP | 0 168 905 | 1/1986 |
| EP | 0 784 008 | 7/1997 |
| WO | WO 00/59773 | 10/2000 |
| WO | WO 2007/067717 | 6/2007 |

OTHER PUBLICATIONS

International Search Report for PCT/EP2010/061349, dated Nov. 8, 2010.

* cited by examiner

*Primary Examiner* — Rodney Butler
*Assistant Examiner* — Frederick Brushaber
(74) *Attorney, Agent, or Firm* — Norton Rose Fulbright US LLP; Gerard Messina

(57) ABSTRACT

A method for regulating an energy recovery in a pedal-driven vehicle having a crank drive, an electric auxiliary drive and a rechargeable energy source includes: detecting a direction of rotation of the crank drive, and recovery of energy and storage of energy in the energy source when the direction of rotation of the crank drive is directed backward.

9 Claims, 1 Drawing Sheet

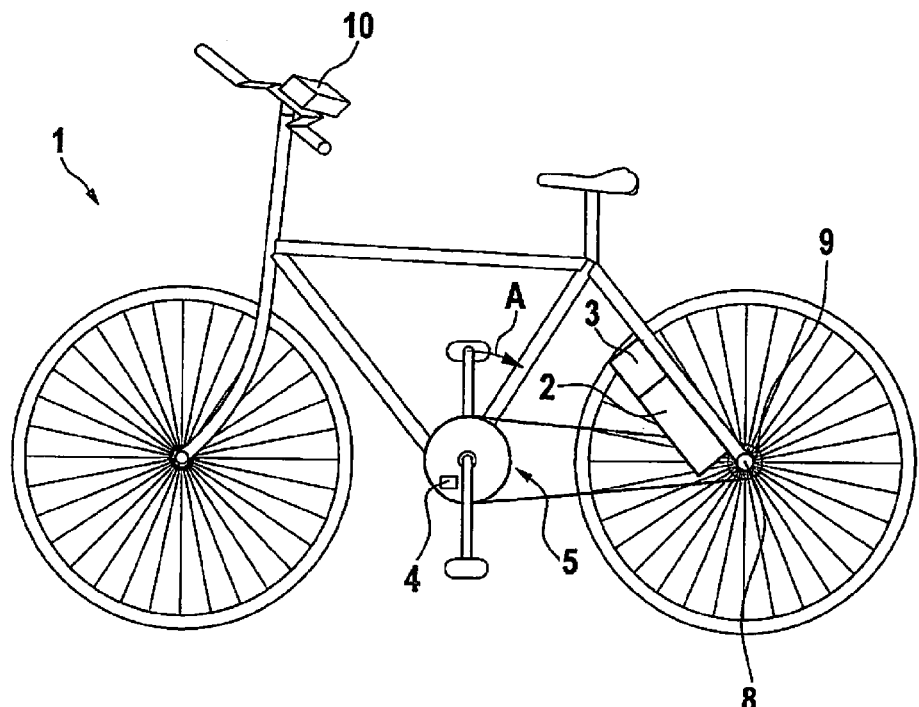
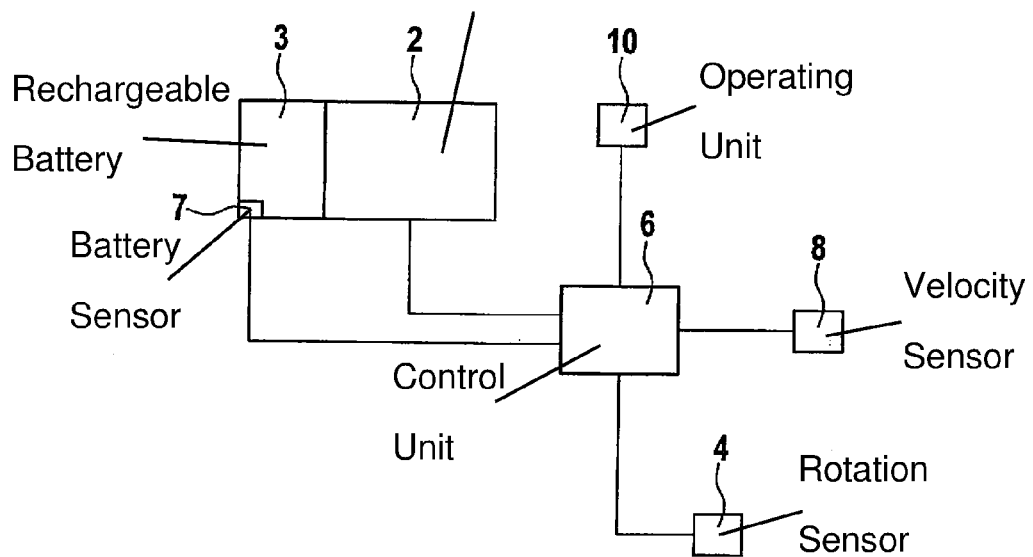

DEVICE AND METHOD FOR REGULATING AN ENERGY RECOVERY IN A PEDAL-DRIVEN VEHICLE

BACKGROUND OF THE INVENTION

1. Field of the Invention

The present invention relates to a device and a method for regulating an energy recovery in a pedal-driven vehicle such as, for example, a bicycle.

2. Description of Related Art

Various designs of bicycles having an electric auxiliary motor are known from the related art. These types of bicycles usually have a manually operable control unit on the handlebar with the aid of which an electric auxiliary drive may be switched on, or which makes energy recovery possible. In this process, changing between the energy recovery and a friction brake is jolting and difficult, because of manual switching. For this reason, the energy recovery of the vehicle is often not utilized during ordinary operation of the vehicle, and thus, no energy is recovered for charging the batteries, although this would actually be possible.

BRIEF SUMMARY OF THE INVENTION

The method according to the present invention has the advantage over the related art that it is easily executable and makes good energy recovery possible. According to the present invention this is achieved in that the method according to the present invention provides for detecting one direction of rotation of a crank drive and, when the direction of rotation of the crank drive is directed backward, energy recovery and storage of energy in the energy storage is carried out. Thus, a user of a pedal-driven vehicle may, simply by reversing the pedal direction, quickly and easily initiate a starting time for an energy recovery. The vehicle may have a free wheel in the reverse direction of rotation of the crank drive, or also a coaster brake. The user may quickly and safely use the method according to the present invention, without having to perform a lengthy search in a control menu of a manual switching element or the like, as in the related art.

In particular, an energy recovery preferably starts only when a predetermined angle of rotation has been traveled by the crank drive in the backward direction. It may be ensured that the energy recovery does not inadvertently start upon a short back pedal stroke. To start the energy recovery, the angle of rotation that must be traveled is preferably between 10° and 30°, and particularly preferably 20°. According to a preferred embodiment of the present invention, the angle of rotation may also be individually set, so that a user may determine at which degree of backpedaling the energy recovery is to start, for example, starting with a full reverse rotation of 360°.

It is further preferred that the direction of rotation of the crank drive is detected at the bottom bracket and/or at the output gear of the chain drive of the bicycle. In a further alternative, the direction of rotation may also be detected by a torque sensor at a foot pedal.

In the method according to the present invention it is particularly preferred that the energy recovery is terminated by a forward rotation of the crank drive. This means that a user may terminate the energy recovery by simply pedaling forward. Consequently, a particularly simple control of the energy recovery may be achieved by a back pedal stroke to start the energy recovery, and by a forward pedal stroke to terminate the energy recovery.

According to a further preferred embodiment of the present invention, in a vehicle that is standing still, and that has a backward directed torque at the foot pedal, an electric stopping brake is activated by an electric auxiliary drive. This means that when a user stands at curbside or at a traffic light and presses the crank drive backward with at least one foot, the electric stopping brake is activated, so that the vehicle cannot roll away unintentionally. An activation of the electric stopping brake may protect the vehicle against theft when parked. Deactivation of the electric stopping brake is preferably carried out by using an external device such as, for example, a key, by entering a code, by a chip, etc. Alternatively, deactivation may also be carried out by applying a forward-directed torque to the crank drive, for example. This is particularly advantageous when the vehicle is standing still on a hill, or at a traffic light.

Moreover, the present invention relates to a vehicle having a crank drive, in particular a bicycle that has an electric auxiliary drive, a control unit and a sensor for detecting the direction of rotation of the crank drive. The control unit is configured in such a way that the electric auxiliary drive is operated in energy recovery mode when the sensor detects a backward direction of rotation at the crank drive. Thus, the control unit makes it possible for a user to determine the point in time of energy recovery simply by a back pedal stroke. Preferably, the control unit is further configured in such a way that in a state of energy recovery, termination of the energy recovery is carried out by pedaling the crank drive forward.

The sensor is preferably an RPM sensor, or a torque sensor, or a resistance strain gauge, and is located on the crank drive, in particular on the foot pedal, or on the output gear.

Moreover, the vehicle preferably also includes a velocity sensor for detecting the instantaneous velocity of the vehicle. With the help of a vehicle's instantaneous velocity value, the control unit may be configured in such a way, for example, that the energy recovery is terminated when the vehicle is braked too severely due to the energy recovery. Alternatively, a parameter for the minimum velocity of the vehicle during the energy recovery may be predefined in order to always maintain the minimum velocity. Moreover, a standstill of the vehicle may also be safely detected, preferably with the aid of a velocity sensor.

BRIEF DESCRIPTION OF THE DRAWINGS

FIG. 1 shows a schematic side view of a bicycle according to an exemplary embodiment of the present invention.

FIG. 2 shows a schematic illustration of the components of an auxiliary drive for the vehicle.

DETAILED DESCRIPTION OF THE INVENTION

In the following, a vehicle according to one preferred exemplary embodiment of the present invention will be described in greater detail with reference to FIGS. 1 and 2. As is apparent in FIG. 1, the vehicle in this exemplary embodiment is a bicycle 1. Bicycle 1 has an auxiliary drive that includes an electric auxiliary drive 2, a rechargeable battery 3 and a control unit 6. Electric auxiliary drive 2 is preferably a compact electric motor having an integrated gear, in particular a planetary gear. The auxiliary drive further includes a direction of rotation sensor 4, which is located at a crank drive 5 of the bicycle. Direction of rotation sensor 4 detects the direction of rotation of crank drive 5, i.e., a direction of rotation forward, or a direction of rotation backward. If direction of rotation sensor 4 does not send a signal to control unit 6, this means that the crank drive is momentarily not being operated. Moreover, a velocity sensor 8 is provided, which detects the instantaneous velocity of bicycle 1. Velocity sensor 8 may be located, for example, on output gear 9 of a chain drive of the vehicle.

Furthermore, an operating unit 10 is located on a handlebar of the bicycle, with the aid of which electric auxiliary drive 2 may be switched on or off.

Control unit 6 of the auxiliary drive is configured in such a way that when the crank drive is pedaled backward, a recuperation, i.e., a recovery of energy, is initiated. This means that when a user pedals the crank drive in the backward direction, i.e., rearward, the electric motor of the electric auxiliary drive is operated as generator and battery 3 is being charged. Battery 3 includes a battery sensor 7, which relays the state of charge of the battery to control unit 6. In FIG. 1, the reverse direction of rotation is indicated by arrow A.

Thus, in a bicycle according to the present invention, energy recovery may be initiated by detecting a reverse direction of rotation of crank drive 5. Termination of energy recovery is carried out by pedaling crank drive 5 forward. Thus, according to the present invention, a very simple possibility of regulating an energy recovery may be provided, which may be operated easily, in particular also by older persons. Since detection of the direction of rotation takes place directly at crank drive 5, no additional, larger installation space is required for a corresponding direction of rotation sensor 4. Since vehicle 1 simultaneously decelerates during energy recovery, in the event of user-desired braking, less braking energy is required when using a hand brake and/or a coaster brake. Moreover, according to the present invention, operating unit 10 may be designed very simply and, in particular, be equipped only with a minimum number of buttons or switches, since the energy recovery takes place at the crank drive caused via a back pedal stroke. For this reason, the operating unit may be equipped with one single switch having two settings, i.e., auxiliary drive ON or OFF, for example. Consequently, the operation is further simplified, in particular for older persons.

What is claimed is:

1. A method for controlling energy recovery in a pedal-operated vehicle having a crank drive configured to be selectively rotated in forward direction and backward direction, an electric auxiliary drive connected to the crank drive, and a rechargeable energy source connected to the auxiliary drive, the method comprising:

detecting, by a sensor, a direction of rotation of the crank drive; and recovering energy from the auxiliary drive and storing the recovered energy in the energy source when the direction of rotation of the crank drive is detected by the sensor as being directed backward, wherein the energy recovery takes place only when a predetermined angle of rotation has been traveled in the backward direction of rotation at the crank drive, the predetermined angle of rotation being caused via a back pedal stroke.

2. The method as recited in claim 1, wherein the predetermined angle of rotation is individually settable by a user of the vehicle.

3. The method as recited in claim 1, wherein the direction of rotation is detected at least one of (i) at a bottom bracket of the crank drive and (ii) at an output gear.

4. The method as recited in claim 1, wherein the energy recovery is terminated if the direction of rotation of the crank drive is switched to the forward direction.

5. The method as recited in claim 1, further comprising:

activating an electric stopping brake by the electric auxiliary drive when the vehicle is standing still and the rotation of the crank drive is directed backward.

6. The method as recited in claim 5, wherein a deactivation of the electric stopping brake is carried out one of (i) with the aid of a key, (ii) by entering a code, (ii) by a chip, or (iv) by a forward rotation of the crank drive.

7. A vehicle, comprising:

a crank drive configured to be selectively rotated in forward direction and backward direction;

an electric auxiliary drive connected to the crank drive;

a sensor detecting the direction of rotation of the crank drive; and a control unit configured to operate the electric auxiliary drive in energy recovery mode when the sensor detects a backward rotation of the crank drive, wherein an energy recovery takes place only when a predetermined angle of rotation has been traveled in the backward direction of rotation at the crank drive, the predetermined angle of rotation being caused via a back pedal stroke.

8. The vehicle as recited in claim 7, wherein the sensor includes at least one of a torque sensor and a resistance strain gauge, and wherein the sensor is located one of on the crank drive or at an output gear.

9. The vehicle as recited in claim 8, further comprising:

a velocity sensor ascertaining a vehicle velocity.

* * * * *